(12) United States Patent
Lou et al.

(10) Patent No.: US 9,355,437 B2
(45) Date of Patent: May 31, 2016

(54) IMAGE POSITION COMPENSATION METHOD AND APPARATUS

(71) Applicant: Shenyang Neusoft Medical Systems Co., Ltd., Shenyang (CN)

(72) Inventors: Shanshan Lou, Shenyang (CN); Jiangwei Zhao, Shenyang (CN)

(73) Assignee: SHENYANG NEUSOFT MEDICAL SYSTEMS CO., LTD., Shenyang (CN)

( * ) Notice: Subject to any disclaimer, the term of this patent is extended or adjusted under 35 U.S.C. 154(b) by 75 days.

(21) Appl. No.: 14/142,945

(22) Filed: Dec. 30, 2013

(65) Prior Publication Data
US 2015/0003705 A1    Jan. 1, 2015

(30) Foreign Application Priority Data

Jun. 28, 2013 (CN) .......................... 2013 1 0273523

(51) Int. Cl.
*G06K 9/00* (2006.01)
*G06T 5/00* (2006.01)
*G06T 11/00* (2006.01)

(52) U.S. Cl.
CPC ............... *G06T 5/006* (2013.01); *G06T 11/005* (2013.01); *G06T 2207/10081* (2013.01); *G06T 2207/30004* (2013.01)

(58) Field of Classification Search
None
See application file for complete search history.

(56) References Cited

U.S. PATENT DOCUMENTS

| 7,020,315 | B2* | 3/2006 | Vaisburd et al. ............. 382/131 |
| 8,135,198 | B2* | 3/2012 | Lachaine ............... A61B 8/483 |
|  |  |  | 382/131 |
| 2006/0093093 | A1* | 5/2006 | Chao ..................... A61B 6/583 |
|  |  |  | 378/207 |

FOREIGN PATENT DOCUMENTS

| CN | 101879069 A | 11/2010 |
| CN | 102805643 A | 12/2012 |
| JP | 2004180846 A | 7/2004 |
| JP | 2006288472 A | 10/2006 |

OTHER PUBLICATIONS

Xu Wei et al., "Impact of Gravity on the Positioning Accuracy of CT Stimulation (along with its English translation)", issued on the Practical Journal of Cancer, Jan. 2007, vol. 22, No. 1, 5 pages.

* cited by examiner

*Primary Examiner* — Jayesh A Patel
(74) *Attorney, Agent, or Firm* — Kilpatrick Townsend & Stockton LLP

(57) ABSTRACT

A method and apparatus of image position compensation are provided. The method may include: measuring an actual height at Z position and a corresponding drop offset of a scanning table; adjusting, according to the drop offset of the scanning table, a vertical coordinate of an image center in the process of post-reconstruction, so as to obtain an adjusted image; and performing an interpolation process on coordinate information and pixel values of a row in the adjusted image, to obtain pixel values of a row in a target image. The target image is an image which has been processed by position compensation. According to the present disclosure, an image generated by a CT apparatus can be compensated to obtain a correct tomographic image and provide accurate image information for medical diagnosis.

16 Claims, 3 Drawing Sheets

```
A1: obtain a height of a X-ray source rotating center, a center coordinate
    of a preview image, a reconstruction field of view (FOV) of a
    preview image, and a matrix size of a preview image A2: search a preview image row by row to obtain a greatest row number
    in which some pixel values are greater than a threshold A3: according to the matrix size of a preview image, the height of the X-
    ray source rotating center, the center coordinate of a preview image,
    the reconstruction FOV of a preview image, and the greatest row
    number in which some pixel values are greater than a threshold,
    calculate an actual height of a scanning table in the preview image A4: calculate a difference between the actual height of the scanning table
    and the nominal height of the scanning table, wherein the difference
    equals to a drop offset of the scanning table
```

US 9,355,437 B2

IMAGE POSITION COMPENSATION METHOD AND APPARATUS

CROSS REFERENCE TO RELATED APPLICATIONS

The present application claims priority to Chinese patent application No. 201310273523.9, filed on Jun. 28, 2013, and entitled "Image Position Compensation Method and Apparatus", the entire disclosure of which is incorporated herein by reference.

TECHNICAL FIELD

The present disclosure generally relates to medical imaging technology, and more particularly, to an image position compensation method and apparatus.

BACKGROUND

X-ray Computed Tomography (CT) system can reconstruct a tomographic image of an object under measurement utilizing computer technology, so as to obtain a three-dimensional (3-D) tomographic image. By transmitting a single axial plane radiation through an object under measurement, a computer acquires the penetrated radiation and generates an image by 3-D reconstruction based on the fact that the radiation absorptivity and transmittance by different parts of the object are different. CT technology is now in widespread use in various fields, such as hospital examination, industrial inspection, security inspection, air transportation, port transportation, large cargo container, etc.

As for hospital examination, the operation principle of a CT system is described as follows. Based on the fact that X-ray absorptivity and transmittance by different human tissues are different, a high-sensitivity apparatus may be used to measure a human body. Measurement data can be acquired and input into a computer for processing. Then, a tomographic or stereoscopic image of a measured position of the human body can be captured, so that a minor lesion can be detected at any position of the human body.

In practical measurements, when a human object is lying on a scanning table, a scanning table extends outside from a supporting platform and delivers the human object to a scanning plane composed of an X-ray source and a detector. The X-ray source and the detector rotate around the human object to acquire scanning data of the human object. Subject to a weight of the human subject, the scanning table may shift downwards to a certain extent with the scanning table's extending length and the human's weight, causing a nominal position of the scanning table does not conform to the actual. When the position of the scanning table does not conform to the actual, the position and profile of a tomographic image reconstructed by the CT system may shift as well, which does not conform to the expected, and in turn causes interference with medical diagnosis.

In light of the above problems, an image position compensation method is needed, so as to implement a scanning table position detection method using normal functions of an X-ray CT apparatus, where a correct tomographic image can be acquired using the image position compensation method, which thereby provides accurate image information for medical diagnosis.

SUMMARY

Embodiments of the present disclosure provide an image position compensation method and apparatus, so that an image generated by a CT apparatus can be compensated to obtain a correct tomographic image and provide accurate image information for medical diagnosis.

In one embodiment, an image position compensation method is provided, which may include:

measuring an actual height at Z position and a corresponding drop offset of a scanning table;

adjusting, according to the drop offset of the scanning table, a vertical coordinate of an image center in the process of post-reconstruction, so as to obtain an adjusted image; and performing an interpolation process on coordinate information and pixel values of each row in the adjusted image, to obtain pixel values of each row in a target image.

In some embodiments, measuring an actual height at Z position and a corresponding drop offset of a scanning table may include:

obtaining a height of a X-ray source rotating center, a center coordinate of a preview image, a reconstruction field of view (FOV) of a preview image, and a matrix size of a preview image;

searching a preview image row by row to obtain a greatest row number in which some pixel values are greater than a threshold;

according to the matrix size of a preview image, the height of the X-ray source rotating center, the center coordinate of a preview image, the reconstruction FOV of a preview image and the greatest row number in which some pixel values are greater than a threshold, calculating an actual height of a scanning table in the preview image; and calculating a difference between the actual height of the scanning table and the nominal height of the scanning table, wherein the difference equals to a drop offset of the scanning table.

In some embodiments, after obtaining a height of a X-ray source rotating center, a center coordinate of a preview image, a reconstruction field of view (FOV) of a preview image, and a matrix size of a preview image, the method further includes:

according to the nominal height of the scanning table, the matrix size of a preview image, the height of the X-ray source rotating center, the center coordinate of a preview image, and the reconstruction FOV of a preview image, calculating a theoretical vertical coordinate value of pixels in the preview image when the height of the scanning table equals to the nominal height;

where searching a preview image row by row to obtain a greatest row number in which some pixel values are greater than a threshold may include:

according to the theoretical vertical coordinate value of pixels in the preview image, searching a plurality of rows neighboring to a row whose vertical coordinate equals to the theoretical vertical coordinate value to obtain a greatest row number where some pixel values are greater than a threshold.

In some embodiments, the step of according to the nominal height of the scanning table, the matrix size of a preview image, the height of the X-ray source rotating center, the center coordinate of a preview image, and the reconstruction FOV of a preview image, calculating a theoretical vertical coordinate value of pixels in the preview image when the height of the scanning table equals to the nominal height may include:

acquiring a nominal height of a scanning table H2, a matrix size of a preview image M×M, a height of a X-ray source rotating center H1, a center coordinate of a preview image $(cX_i, cY_i)$, and a reconstruction FOV of a preview image FOV; and according to equation $$Y_{couch}^{init} = \left\lfloor \frac{M-1}{2} + \frac{cY_i - (H2 - H1)}{\Delta p} \right\rfloor,$$

calculating a vertical coordinate value $Y_{couch}^{init}$ of pixels in the preview image when the height of the scanning table equals to the nominal height, where the operator $\lfloor \bullet \rfloor$ represents integer arithmetic, $$\Delta p = \frac{FOV}{M}$$

represents an actual width of a pixel, and $cY_i$ represents a vertical coordinate value of the image center.

In some embodiments, the step of according to the matrix size of a preview image, the height of the X-ray source rotating center, the center coordinate of a preview image, the reconstruction FOV of a preview image and the determined row having the greatest row number, calculating an actual height of a scanning table in the preview image may include:

acquiring a nominal height of a scanning table H2, a matrix size of a preview image M×M, a height of a X-ray source rotating center H1, a center coordinate of a preview image $(cX_i, cY_i)$, a reconstruction FOV of a preview image FOV, and the greatest row number $Y_{couch}$; and according to equation $$H_i = cY_i + \left(\frac{M-1}{2} - Y_{couch}\right) * \Delta p + H1,$$

calculating an actual height $H_i$ of a scanning table in the preview image, where $$\Delta p = \frac{FOV}{M}$$

represents an actual width of a pixel.

In some embodiments, measuring an actual height at Z position and a corresponding drop offset of a scanning table may include:

obtaining a height of a X-ray source rotating center, a center coordinate of a pilot image, a reconstruction field of view (FOV) of a pilot image, and a matrix size of a pilot image;

searching in each column of a pilot image to find a greatest row number in which pixel value is greater than a threshold;

according to the matrix size of a pilot image, the height of the X-ray source rotating center, the center coordinate of a pilot image, the reconstruction FOV of a pilot image and in each column the greatest row number in which pixel value is greater than a threshold, calculating an actual height of a scanning table at Z position in the pilot image; and calculating a difference between the actual height of the scanning table and the nominal height of the scanning table, where the difference equals to a drop offset of the scanning table at the Z position.

In some embodiments, after obtaining a height of a X-ray source rotating center, a center coordinate of a pilot image, a reconstruction field of view (FOV) of a pilot image, and a matrix size of a pilot image, the method further includes:

according to the nominal height of the scanning table, the matrix size of a pilot image, the height of the X-ray source rotating center, the center coordinate of a pilot image, and the reconstruction FOV of a pilot image, calculating a theoretical vertical coordinate value of pixels in the pilot image when the height of the scanning table equals to the nominal height;

where searching in each column of a pilot image to find a greatest row number in which pixel value is greater than a threshold may include:

in each column, according to the theoretical vertical coordinate value of pixels in the pilot image, searching a plurality of rows neighboring to a row whose vertical coordinate equals to the theoretical vertical coordinate value to obtain a greatest row number where pixel value is greater than a threshold.

In some embodiments, the step of according to the nominal height of the scanning table, the matrix size of a pilot image, the height of the X-ray source rotating center, the center coordinate of a pilot image, and the reconstruction FOV of a pilot image, calculating a theoretical vertical coordinate value of pixels in the pilot image when the height of the scanning table equals to the nominal height may include:

acquiring a nominal height of a scanning table H2, a matrix size of a pilot image N×M, a height of a X-ray source rotating center H1, a center coordinate of a pilot image (cX,cY), and a reconstruction FOV of a pilot image FOV; and according to equation $$Y_{couch}^{init} = \left\lfloor \frac{M-1}{2} + \frac{cY - (H2 - H1)}{\Delta p} \right\rfloor,$$

calculating a vertical coordinate value $Y_{couch}^{init}$ of pixels in the pilot image when the height of the scanning table equals to the nominal height, where the operator $\lfloor \bullet \rfloor$ represents integer arithmetic, $$\Delta p = \frac{FOV}{M}$$

represents an actual width of a pixel, and cY represents a vertical coordinate value of the image center.

In some embodiments, the step of according to the matrix size of a pilot image, the height of the X-ray source rotating center, the center coordinate of a pilot image, the reconstruction FOV of a pilot image and in each column the greatest row number in which pixel value is greater than a threshold, calculating an actual height of a scanning table at Z position in the preview image may include:

acquiring a nominal height of a scanning table H2, a matrix size of a pilot image N×M, a height of a X-ray source rotating center H1, a center coordinate of a pilot image (cX,cY), a reconstruction FOV of a pilot image FOV, and the greatest row number $Y_{couch}$; and according to equation $$H_i = cY + \left(\frac{M-1}{2} - Y_{couch}\right) * \Delta p + H1,$$

calculating an actual height $H_i$ of a scanning table at a Z position $Z_i$ in the pilot image, where $$\Delta p = \frac{FOV}{M}$$

represents an actual width of a pixel.

In some embodiments, performing an interpolation process on coordinate information and pixel values of each row in the adjusted image, to obtain pixel values of each row in a target image may include:

obtaining coordinate information (Y(m),Z(m)) of each row from each of the $$Y(m) = \left(\frac{M-1}{2} - m\right) * \Delta p + C(Z_p)$$

adjusted images, where $Z(m)=Z_P$
where $m=0, \ldots, M-1$ represents a row number, $Z_P$ represents a table Z position at which the $P^{th}$ image is reconstructed, $C(Z_P)$ represents a vertical coordinate of an image center of the $P^{th}$ image which has been adjusted;

calculating coordinate information (y(n),z(n)) of each row of the target image, where y(n) represents y axis coordinate of the $n^{th}$ row, z(n) represents z axis coordinate of the $n^{th}$ row, and $n=0, \ldots, M-1$ represents a row number; and performing an interpolation process on (Y(m),Z(m)) in both Y and Z directions, so as to obtain pixel values of a target image, whose coordinate is (y(n),z(n)).

In some embodiments, a line which the target image center lies on may be obtained by:

performing curve-fitting, using the least square method, on a position $Z_i$ that a scanning table locates when each image is reconstructed and a corresponding drop offset $D(Z_i)$ of the scanning table, to obtain a line $y=kz+b$ that the scanning table locates with bias;

according to a vertical relation between a line that a target image center lies on and a line that the scanning table locates with bias, calculating the line that the target image center locates $$y = -\frac{1}{k}z + \frac{(Z_i - Z_s)\sqrt{k^2+1} + Z_s}{k},$$

where $$Z_s = -\frac{b}{k}$$

represents an intercept of the line that the scanning table locates with bias on z axis; and according to the line that the target image center lies on $$y = -\frac{1}{k}z + \frac{(Z_i - Z_s)\sqrt{k^2+1} + Z_s}{k},$$

calculating coordinate information (y(n),z(n)) of each row in the target image, where $$y(n) = \frac{\left(\frac{M-1}{2} - n\right) * \Delta p}{\sqrt{1+k^2}} + C\left(Z_s + \frac{(Z_i - Z_s)}{\sqrt{1+k^2}}\right)$$

-continued $$z(n) = -y(n) * k + (Z_i - Z_s)\sqrt{k^2+1} + Z_s$$

where y(n) represents y axis coordinate of the $n^{th}$ row, z(n) represents z axis coordinate of the $n^{th}$ row, and $n=0, \ldots, M-1$ represents a row number.

In one embodiment, an image position compensation apparatus is provided, which may include:

a measurement device, configured to measure an actual height at Z position and a corresponding drop offset of a scanning table;

an adjusting device, configured to adjust, according to the drop offset of the scanning table, a vertical coordinate of an image center in the process of post-reconstruction, so as to obtain an adjusted image; and an interpolation device, configured to perform an interpolation process on coordinate information and pixel values of each row in the adjusted image, to obtain pixel values of each row in a target image.

In light of the above, an image position compensation method and apparatus provided in embodiments of the present disclosure may be implemented by measuring an actual height at Z position and a corresponding drop offset of a scanning table; adjusting, according to the drop offset of the scanning table, a vertical coordinate of an image center in the process of post-reconstruction, so as to obtain an adjusted image; and performing an interpolation process on coordinate information and pixel values of each row in the adjusted image, to obtain pixel values of each row in a target image. Subject to a weight of a human subject, a scanning table may shift downwards to a certain extent when in operation, causing an scanned image can not truly reflect drop offset information of the scanning table, as the scanned image reflects diagonal plane information of the human subject, while an expected target image reflects normal section information of the human subject. Therefore, according to the present disclosure, an expected target image can be obtained with an interpolation method by using a relationship between the target image and the reconstruction image. Thus, a correct tomographic scanned image can be acquired by compensating an original scanned image using the image position compensation method and apparatus provided in the present disclosure, which thereby provides accurate image information for medical diagnosis.

BRIEF DESCRIPTION OF THE DRAWINGS

A further understanding of the nature and advantages of various embodiments may be realized by reference to the following figures. The accompanying drawings are presented for descriptive purpose, but not intended to be limiting. To those skilled in the art, other accompanying drawings may be obtained according to the disclosure without creative work.

DETAILED DESCRIPTION

In order to clarify the objects, characteristics and advantages of the disclosure, the embodiments of the present disclosure will be described in detail in conjunction with the accompanying drawings.

It should be noted that the method provided in the present disclosure is suitable for an X-ray CT apparatus. Typically, an X-ray CT apparatus may include a scanning table, an operation platform, an X-ray source and a detector. A scanning process may include: first, an object to be measured lying on the scanning table; the scanning table extending outside from the operation platform and delivering the object to a scanning plane composed of the X-ray source and the detector, finally, the X-ray source and the detector rotating around the human object to acquire scanning data of the object. Generally, image reconstruction needs to be done twice. The first is to acquire a preview image by quick image reconstruction based on related scanning data, which may be used by a doctor to quickly preview or position a nidus or a body part (usually the image quality is not very good). The second is to acquire a reconstructed image by image reconstruction based on related scanning data, which may reflect an actual condition of the object under measurement more detailed. The second image processing is referred to as post-reconstruction.

In order to determine a position range for scanning operation, a CT apparatus needs to generate a pilot image. Assuming that a human body needs to be measured on his/her abdomen, because a position of each human body lying on a scanning table is different as the height of each human is different, a pilot image is required to determine a position range for scanning operation.

Embodiment One

Figure 1:
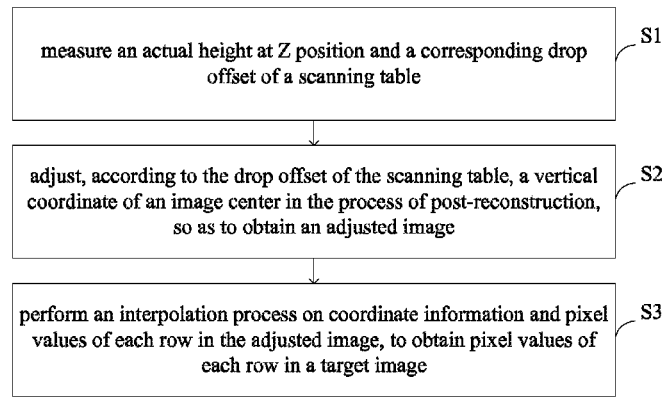
FIG. 1 schematically illustrates a flow chart of an image position compensation method according to a first embodiment of the present disclosure.

Referring to FIG. 1, FIG. 1 schematically illustrates a flow chart of an image position compensation method according to a first embodiment of the present disclosure. The method may include the steps of S1, S2 and S3.

S1, measure an actual height at Z position and a corresponding drop offset of a scanning table;

In practical scanning operation, subject to a weight of an object to be measured, a scanning table, which delivers the object to a scanning plane composed of an X-ray source and a detector, may shift downwards at different table positions to a certain extent. Therefore, a drop offset may generate compared with a nominal height of the scanning table. Typically, any scanning table of a CT apparatus has a nominal height which can be known from a product specification of the CT apparatus.

In a CT apparatus, a scanning table has a plurality of scales (hereinafter referred to as scale position). That is, each table position corresponds to a scale value. For example, if a scanning table has a length of 3 m, the scanning table may have a scale value from beginning to end corresponding to a value from 0 cm to 300 cm. The scale value may be used to indicate an image reconstructed at a position of the scanning table. Assuming that 5 images need to be reconstructed of an object, each image may be reconstructed every 1 cm at the scale values from 31 cm to 35 cm. That is, one slice of image is reconstructed at the scale values of 31 cm, 32 cm, 33 cm, 34 cm and 35 cm, respectively, which thus obtains a total of 5 images. When reconstructing the 5 images, the scanning table shifts at a position corresponding to 5 scale positions. Therefore, a drop offset relative to the nominal height of the scanning table can be calculated. As for a CT apparatus, the scanning plane composed of the X-ray source and the detector is regarded as a XY plane. The scanning table locates in Z direction perpendicular to the XY plane. Therefore, the scale position on the scanning table is referred to as a Z position.

S2, adjust, according to the drop offset of the scanning table, a vertical coordinate of an image center in the process of post-reconstruction, so as to obtain an adjusted image;

Before perform the reconstruction process, the position and number of images to be reconstructed may be pre-determined according to practical requirements. Each image has a center coordinate (including vertical coordinate and horizontal ordinate), which is based on a plane-coordinate system with a X-ray source rotating center of the scanning apparatus as the origin.

When the scanning table drops downwards, the horizontal coordinate of the image center is unchanged, while the vertical coordinate of the image center is changed. The ideal center coordinate of the image is determined related to a nominal height of the scanning table. Therefore, when the scanning table drops downwards, the ideal center coordinate may change as well. According to the drop offset at a scale position where an image is reconstructed, the vertical coordinate of the image center is adjusted to obtain a reconstruction image. That is, each point in the original image shifts downwards during reconstruction. The vertical coordinate of the image center may be adjusted as follows. If the vertical coordinate of the image center is cY, the adjusted vertical coordinate is $C(Z_i)$, a corresponding drop offset is $D(Z_i)$, the vertical coordinate of the image center may be adjusted according to equation $C(Z_i)=cY-D(Z_i)$.

S3, perform an interpolation process on coordinate information and pixel values of each row in the adjusted image, to obtain pixel values of each row in a target image.

A target image can be obtained using an interpolation method, based on coordinate information and pixel values corresponding to the coordinate information of a plurality of images neighboring to an image to be compensated. The target image can truly reflect practical information of the object under measurement, namely, a normal section information.

From the above-mentioned embodiments, according to the image position compensation method of the present disclosure, a target image can be obtained by measuring a actual height at Z position and a corresponding drop offset of a scanning table; adjusting, according to the drop offset of the scanning table, a vertical coordinate of an image reconstruction center in the process of post-reconstruction, so as to obtain an adjusted image; and performing an interpolation process on coordinate information and pixel values of each row in the adjusted image, to obtain pixel values of each row in a target image. By analyzing the relationship between the target image and the reconstruction image, the target image can be obtained with an interpolation method. In this way, the image which has been processed with the image position compensation method can truly reflect practical information of the object under measurement, and can provide correct image information for medical diagnosis, which thereby improves measurement quality of a CT apparatus.

Embodiment Two

An image position compensation method may be described in detail in accompany with a practical application scenario. Specifically, an object to be measured is scanned by a CT apparatus to obtain some scanned images. For example, image may be reconstructed at 10 different positions of a scanning table, respectively, which thus obtains a total of 10 images. By processing a preview image, a drop offset of the scanning table can be measured. Specifically, the method may include:

S201, measure an actual height at Z position and a corresponding drop offset of a scanning table;

Each preview image corresponds to a Z position of the scanning table when it is reconstructed by scanning initially.

Figure 2:
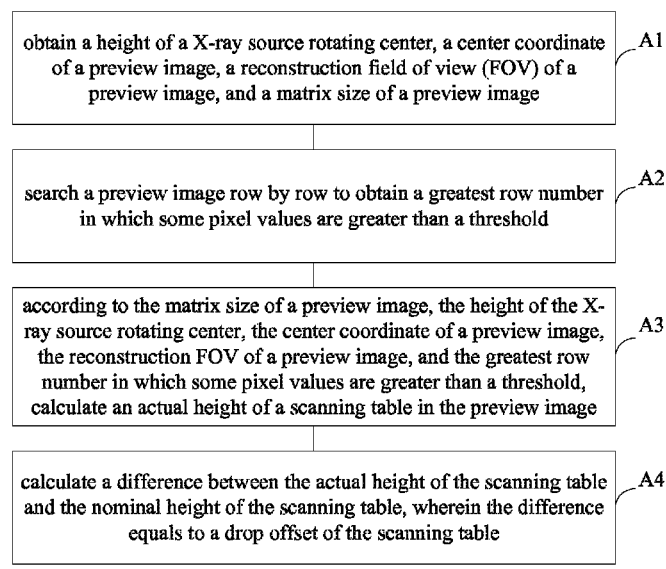
FIG. 2 schematically illustrates a flow chart of a method for measuring an actual height at Z position and a corresponding drop offset of a scanning table according to a second embodiment of the present disclosure.

Referring to FIG. 2, FIG. 2 schematically illustrates a flow chart of a method for measuring an actual height at Z position and a corresponding drop offset of a scanning table according to the second embodiment of the present disclosure. The method may include steps of A1 to A4.

A1, obtain a height of a X-ray source rotating center, a center coordinate of a preview image, a reconstruction field of view (FOV) of a preview image, and a matrix size of a preview image;

A2, search a preview image row by row to obtain a greatest row number in which some pixel values are greater than a threshold;

A3, according to the matrix size of a preview image, the height of the X-ray source rotating center, the center coordinate of a preview image, the reconstruction FOV of a preview image, and the greatest row number in which some pixel values are greater than a threshold, calculate an actual height of a scanning table in the preview image; and A4, calculate a difference between the actual height of the scanning table and the nominal height of the scanning table, wherein the difference equals to a drop offset of the scanning table.

In order to improve measuring efficiency, another method for measuring an actual height at Z position and a corresponding drop offset of a scanning table according to the second embodiment is provided. The method may include steps of B1 to B5. The steps of B1, B4 and B5 are similar to the steps A1, A3 and A4, respectively, and will not be described in detail herein. After B1, the method may further include step B2: according to the nominal height of the scanning table, the matrix size of a preview image, the height of the X-ray source rotating center, the center coordinate of a preview image, and the reconstruction FOV of a preview image, calculating a theoretical vertical coordinate value of pixels in the preview image when the height of the scanning table equals to the nominal height.

Figure 3:
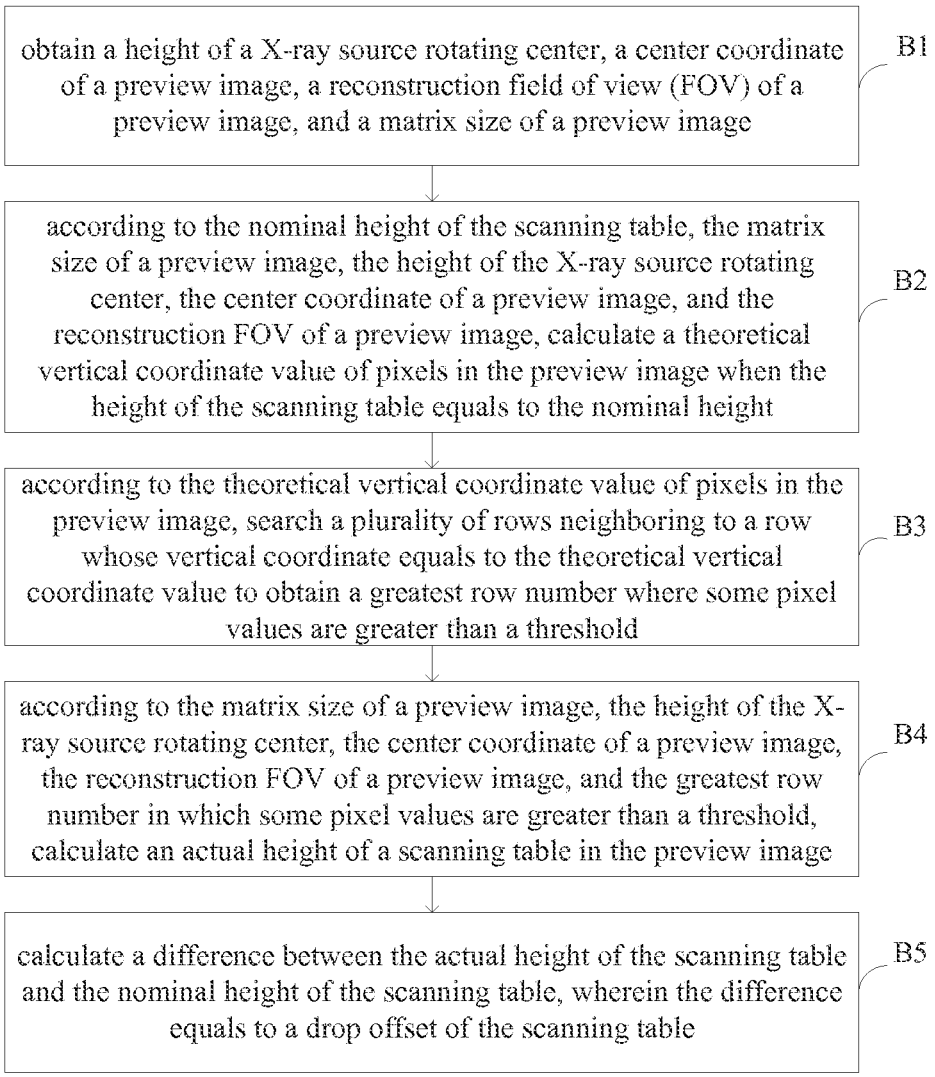
FIG. 3 schematically illustrates a flow chart of another method for measuring an actual height at Z position and a corresponding drop offset of a scanning table according to the second embodiment of the present disclosure.

In this case, the step B3 may include: according to the theoretical vertical coordinate value of pixels in the preview image, searching a plurality of rows neighboring to a row whose vertical coordinate equals to the theoretical vertical coordinate value to obtain a greatest row number where some pixel values are greater than a threshold. Specifically, the method may refer to FIG. 3, which schematically illustrates a flow chart of another method for measuring an actual height at Z position and a corresponding drop offset of a scanning table according to the second embodiment of the present disclosure.

In some embodiments, the step B2 may include:

acquiring a nominal height of a scanning table H2, a matrix size of a preview image M×M, a height of a X-ray source rotating center H1, a center coordinate of a preview image $(cX_i, cY_i)$, and a reconstruction FOV of a preview image FOV; and according to equation $$Y_{couch}^{init} = \left\lfloor \frac{M-1}{2} + \frac{cY_i - (H2 - H1)}{\Delta p} \right\rfloor,$$

calculating a vertical coordinate value $Y_{couch}^{init}$ of pixels in the preview image when the height of the scanning table equals to the nominal height, where the operator $\lfloor \cdot \rfloor$ represents integer arithmetic, $$\Delta p = \frac{FOV}{M}$$

represents an actual width of a pixel, and $cY_i$ represents a vertical coordinate value of the image center.

In some embodiments, the step A3 may include:

acquiring a nominal height of a scanning table H2, a matrix size of a preview image M×M, a height of a X-ray source rotating center H1, a center coordinate of a preview image $(cX_i, cY_i)$, a reconstruction FOV of a preview image FOV, and the greatest row number $Y_i$; and according to equation $$H_i = cY_i + \left(\frac{M-1}{2} - Y_{couch}\right) * \Delta p + H1,$$

calculating an actual height $H_i$ of a scanning table in the preview image, where $$\Delta p = \frac{FOV}{M}$$

represents an actual width of a pixel.

S202, adjust, according to the drop offset of the scanning table, a vertical coordinate of a image center in the process of post-reconstruction, so as to obtain an adjusted image; and S203, perform an interpolation process on coordinate information and pixel values of each row in the adjusted image, to obtain pixel values of each row in a target image.

In some embodiments, S203 may include:

obtaining coordinate information (Y(m),Z(m)) of each row from each of $$Y(m) = \left(\frac{M-1}{2} - m\right) * \Delta p + C(Z_P)$$

the adjusted images, where $Z(m) = Z_P$
where m=0, . . . , M−1 represents a row number, $Z_P$ represents a scale position at which a $P^{th}$ image is reconstructed by the scanning table. $C(Z_P)$ represents a vertical coordinate of an image center of the $P^{th}$ image which has been adjusted;

calculating coordinate information (y(n),z(n)) of each row of the target image, where y(n) represents y axis coordinate of a $n^{th}$ row, z(n) represents z axis coordinate of a $n^{th}$ row, and n=0, . . . , M−1 represents a row number; and performing an interpolation process on (y(m),z(m)) in both Y and Z directions, so as to obtain pixel values of a target image, whose coordinate is (y(n),z(n)).

In some embodiments, a line that the target image center lies on may be obtained by:

performing curve-fitting, using the least square method, on a scale position $Z_i$ that a scanning table locates when each image is reconstructed and a corresponding drop offset $D(Z_i)$ of the scanning table, to obtain a line $y=kz+b$ that the scanning table locates with bias (a line of the table surface with bias);

where curve-fitting is a method to fit observed data using an appropriate type of curve, and analyze a relationship between two variables using a fitted curve equation; the observed data used in the curve-fitting algorithm includes a scale position $Z_i$ that a scanning table when an image is constructed and an actual height of the scanning table; that is, the two variables in the fitted curve equation refer to a scale position that a scanning table locates when an image is constructed and an actual height of the scanning table;

according to a vertical relation between a line that a target image center lies on and a line that the scanning table locates with bias, calculating the line that the target image lies on $$y = -\frac{1}{k}z + \frac{(Z_i - Z_s)\sqrt{k^2+1} + Z_s}{k},$$

where $$Z_s = -\frac{b}{k}$$

represents an intercept of the line that the scanning table locates with bias on z axis; and according to the line that the target image center locates $$y = -\frac{1}{k}z + \frac{(Z_i - Z_s)\sqrt{k^2+1} + Z_s}{k},$$

calculating coordinate information (y(n),z(n)) of each row in the target image, where $$y(n) = \frac{\left(\frac{M-1}{2} - n\right)*\Delta p}{\sqrt{1+k^2}} + C\left(Z_s + \frac{(Z_i - Z_s)}{\sqrt{1+k^2}}\right)$$

$$z(n) = -y(n)*k + (Z_i - Z_s)\sqrt{k^2+1} + Z_s$$

where y(n) represents y axis coordinate of the $n^{th}$ row, z(n) represents z axis coordinate of the $n^{th}$ row, and n=0, ..., M−1 represents a row number.

In light of the second embodiment, a method for measuring a scanning table provided in the present invention can obtain a target image by measuring an actual height of the scanning table at a position where an image is constructed; calculating a drop offset using the actual height to adjust a reconstruction image; and performing an interpolation process on coordinate information of the adjusted image so as to obtain pixel values of the target image based on the fact that the target image is a normal section perpendicular to scanning table (Z axis). In this way, an image can be compensated in the process of post-reconstruction, which makes convenient for image processing. The image which has been processed with the image position compensation method can truly reflect practical information of the object under measurement, can modify bias of image center and inaccuracy of image position caused by the drop offset of the scanning table, and can provide correct image information for medical diagnosis, which thereby improves measurement quality of a CT apparatus.

Embodiment Three

Figure 4:
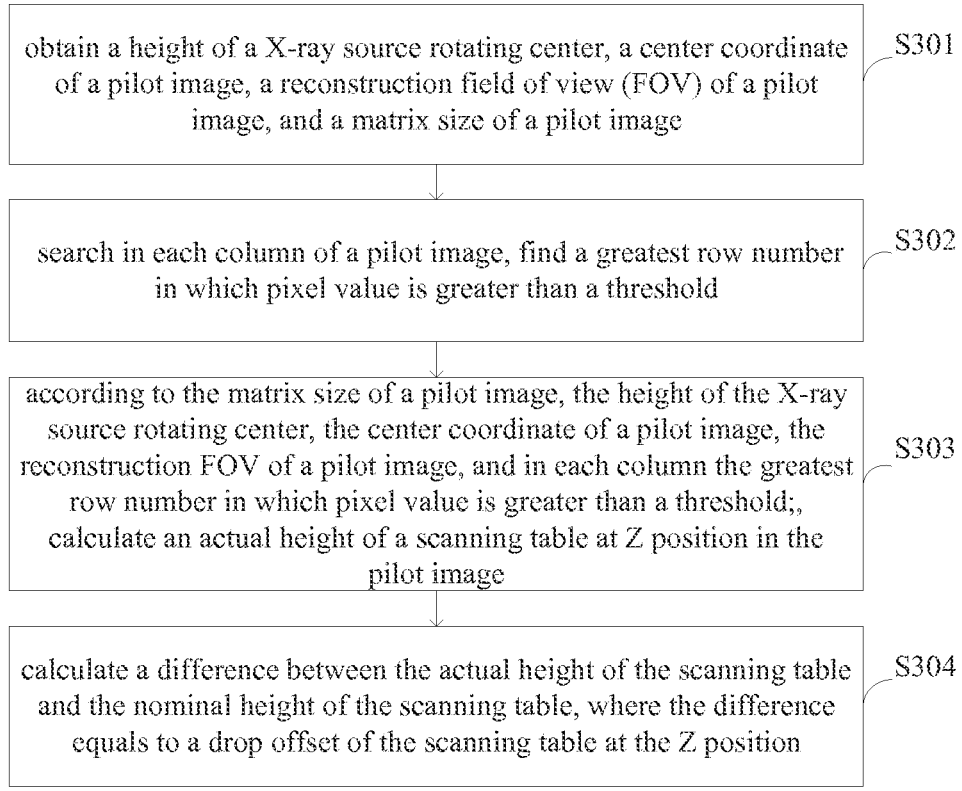
FIG. 4 schematically illustrates a flow chart of a method for measuring an actual height at Z position and a corresponding drop offset of a scanning table according to a third embodiment of the present disclosure.

A method for obtaining an actual height of a scanning table and a corresponding drop offset by processing a pilot image is provided in the third embodiment. FIG. 4 schematically illustrates a flow chart of a method for measuring an actual height at Z position and a corresponding drop offset of a scanning table according to a third embodiment of the present disclosure. Referring to FIG. 4, the method may include steps of S301 to S304.

S301, obtain a height of a X-ray source rotating center, a center coordinate of a pilot image, a reconstruction field of view (FOV) of a pilot image, and a matrix size of a pilot image;

S302, search in each column of a pilot image, find a greatest row number in which pixel value is greater than a threshold;

S303, according to the matrix size of a pilot image, the height of the X-ray source rotating center, the center coordinate of a pilot image, the reconstruction FOV of a pilot image, and in each column the greatest row number in which pixel value is greater than a threshold, calculate an actual height of a scanning table at Z position in the pilot image;

In some embodiments, the step S303 may include:

acquiring a nominal height of a scanning table H2, a matrix size of a pilot image N×M, a height of a X-ray source rotating center H1, a center coordinate of a pilot image (cX,cY), a reconstruction FOV of a pilot image FOV, and the greatest row number $Y_{couch}$; and according to equation $$H_i = cY + \left(\frac{M-1}{2} - Y_{couch}\right)*\Delta p + H1,$$

calculating an actual height $H_i$ of a scanning table at a Z position $Z_i$ in the pilot image, where $$\Delta p = \frac{FOV}{M}$$

represents an actual width of a pixel.

S304, calculate a difference between the actual height of the scanning table and the nominal height of the scanning table, where the difference equals to a drop offset of the scanning table at the Z position.

In order to improve measuring efficiency, the method may further include the following steps after S301: according to the nominal height of the scanning table, the matrix size of a pilot image, the height of the X-ray source rotating center, the center coordinate of a pilot image, and the reconstruction FOV of a pilot image, calculating a theoretical vertical coordinate value of pixels in the pilot image when the height of the scanning table equals to the nominal height.

In this case, the step S302 may include: according to the theoretical vertical coordinate value of pixels in the pilot image, in each column of the pilot image, searching a plurality of rows neighboring to a row whose vertical coordinate equals to the theoretical vertical coordinate value to obtain a greatest row number where pixel value is greater than a threshold.

In some embodiments, the step of according to the nominal height of the scanning table, the matrix size of a pilot image, the height of the X-ray source rotating center, the center coordinate of a pilot image, and the reconstruction FOV of a pilot image, calculating a theoretical vertical coordinate value of pixels in the pilot image when the height of the scanning table equals to the nominal height, may include:

acquiring a nominal height of a scanning table H2, a matrix size of a pilot image N×M, a height of a X-ray source rotating center H1, a center coordinate of a pilot image (cX,cY), and a reconstruction FOV of a pilot image FOV; and according to equation $$Y_{couch}^{init} = \left\lfloor \frac{M-1}{2} + \frac{cY - (H2-H1)}{\Delta p} \right\rfloor,$$

calculating a vertical coordinate value $Y_{couch}^{init}$ of pixels in the pilot image when the height of the scanning table equals to the nominal height, where the operator $\lfloor \cdot \rfloor$ represents integer arithmetic, $$\Delta p = \frac{FOV}{M}$$

represents an actual width of a pixel, and cY represents a vertical coordinate value of the image center.

Embodiment Four

Figure 5:
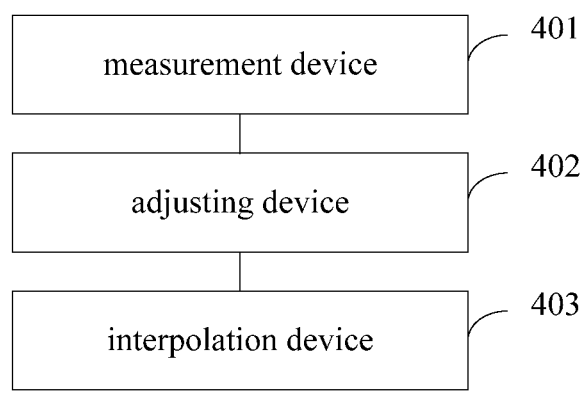
FIG. 5 schematically illustrates a structural view of an image position compensation apparatus according to the third embodiment of the present disclosure.

Corresponding to the image position compensation method provided in the first embodiment, an image position compensation is provided. FIG. 5 schematically illustrates a structural view of an image position compensation apparatus according to the third embodiment of the present disclosure. The image position compensation apparatus includes a measurement device 401, an adjusting device 402 and an interpolation device 403. Hereunder, an internal structure and a connection relationship of the apparatus will be described in detail in accompanying with its operation principle.

The measurement device 401 is configured to measure an actual height at Z position and a corresponding drop offset of a scanning table.

The adjusting device 402 is configured to adjust, according to the drop offset of the scanning table, a vertical coordinate of an image center in the process of post-reconstruction, so as to obtain an adjusted image.

The interpolation device 403 is configured to perform an interpolation process on coordinate information and pixel values of each row in the adjusted image, to obtain pixel values of each row in a target image.

In some embodiments, the measurement device may include:

a first acquiring module, configured to obtain a height of a X-ray source rotating center, a center coordinate of a preview image, a reconstruction field of view (FOV) of a preview image, and a matrix size of a preview image;

a first search module, configured to search a preview image row by row to obtain a greatest row number in which some pixel values are greater than a threshold;

a first calculation module, configured to calculate, according to the matrix size of a preview image, the height of the X-ray source rotating center, the center coordinate of a preview image, the reconstruction FOV of a preview image and the greatest row number in which some pixel values are greater than a threshold, an actual height of a scanning table in the preview image; and a first difference module, configured to calculate a difference between the actual height of the scanning table and the nominal height of the scanning table, where the difference equals to a drop offset of the scanning table.

In some embodiments, the measurement device may further include: a first estimation module, configured to calculate, according to the nominal height of the scanning table, the matrix size of a preview image, the height of the X-ray source rotating center, the center coordinate of a preview image and the reconstruction FOV of a preview image, a theoretical vertical coordinate value of pixels in the preview image when the height of the scanning table equals to the nominal height.

In this case, the first search module may be configured to search, according to the theoretical vertical coordinate value of pixels in the preview image, a plurality of rows neighboring to a row whose vertical coordinate equals to the theoretical vertical coordinate value to obtain a greatest row number where some pixel values are greater than a threshold.

In some embodiments, the first estimation module may include:

a first acquiring sub-module, configured to acquire a nominal height of a scanning table H2, a matrix size of a preview image M×M, a height of a X-ray source rotating center H1, a center coordinate of a preview image ($cX_i, cY_i$), and a reconstruction FOV of a preview image FOV; and a first estimation sub-module, configured to calculate, according to equation $$Y_{couch}^{init} = \left\lfloor \frac{M-1}{2} + \frac{cY_i - (H2-H1)}{\Delta p} \right\rfloor,$$

a vertical coordinate value $Y_{couch}^{init}$ of pixels in the preview image when the height of the scanning table equals to the nominal height, where the operator $\lfloor \cdot \rfloor$ represents integer arithmetic, $$\Delta p = \frac{FOV}{M}$$

represents an actual width of a pixel, and $cY_i$ represents a vertical coordinate value of the image center.

In some embodiments, the first calculation module may include:

a first obtaining sub-module, configured to acquire a nominal height of a scanning table H2, a matrix size of a preview image M×M, a height of a X-ray source rotating center H1, a center coordinate of a preview image ($cX_i, cY_i$), a reconstruction FOV of a preview image FOV, and the greatest row number $Y_{couch}$; and a first calculation sub-module, configured to calculate, according to equation $$H_i = cY_i + \left( \frac{M-1}{2} - Y_{couch} \right) * \Delta p + H1,$$

an actual height $H_i$ of a scanning table in the preview image, where $$\Delta p = \frac{FOV}{M}$$

represents an actual width of a pixel.

The measurement device may include:

a second acquiring module, configured to obtain a height of a X-ray source rotating center, a center coordinate of a pilot image, a reconstruction field of view (FOV) of a pilot image, and a matrix size of a pilot image;

a second search module, configured to search in each column of a pilot image to find a greatest row number in which pixel value is greater than a threshold;

a second calculation module, configured to calculate, according to the matrix size of a pilot image, the height of the X-ray source rotating center, the center coordinate of a pilot image, the reconstruction FOV of a pilot image and in each column the greatest row number in which pixel value is greater than a threshold, an actual height of a scanning table at Z position in the preview image; and a second difference module, configured to calculate a difference between the actual height of the scanning table and the nominal height of the scanning table, where the difference equals to a drop offset of the scanning table at the Z position.

In order to improve measuring accuracy of the measurement device, the measurement device may further include:

a second estimation module, configured to calculate, according to the nominal height of the scanning table, the matrix size of a pilot image, the height of the X-ray source rotating center, the center coordinate of a pilot image and the reconstruction FOV of a pilot image, a theoretical vertical coordinate value of pixels in the pilot image when the height of the scanning table equals to the nominal height.

In this case, the second search module may be configured to search in each column of a pilot image, according to the theoretical vertical coordinate value of pixels in the pilot image, a plurality of rows neighboring to a row whose vertical coordinate equals to the theoretical vertical coordinate value to obtain a greatest row number where pixel value is greater than a threshold.

In some embodiments, the second estimation module may include:

a second acquiring sub-module, configured to acquire a nominal height of a scanning table H2, a matrix size of a pilot image N×M, a height of a X-ray source rotating center H1, a center coordinate of a pilot image (cX,cY), and a reconstruction FOV of a pilot image FOV; and a second estimation sub-module, configured to calculate, according to equation $$Y_{couch}^{init} = \left\lfloor \frac{M-1}{2} + \frac{cY_i - (H2 - H1)}{\Delta p} \right\rfloor,$$

a vertical coordinate value $Y_{couch}^{init}$ of pixels in the pilot image when the height of the scanning table equals to the nominal height, where the operator $\lfloor \cdot \rfloor$ represents integer arithmetic, $$\Delta p = \frac{FOV}{M}$$

represents an actual width of a pixel, and cY represents a vertical coordinate value of the image center.

In some embodiments, the second calculation module may include:

a second obtaining sub-module, configured to acquire a nominal height of a scanning table H2, a matrix size of a pilot image N×M, a height of a X-ray source rotating center H1, a center coordinate of a pilot image (cX,cY), a reconstruction FOV of a pilot image FOV, and the greatest row number $Y_{couch}$; and a second calculation sub-module, configured to calculate, according to equation $$H_i = cY_i + \left( \frac{M-1}{2} - Y_{couch} \right) * \Delta p + H1,$$

an actual height $H_i$ of a scanning table at a Z position $Z_i$ in the pilot image, where $$\Delta p = \frac{FOV}{M}$$

represents an actual width of a pixel.

In some embodiments, the interpolation device may include:

a first coordinate module, configured to obtain coordinate information (Y(m),Z(m)) of each row from each of the adjusted images, where $$Y(m) = \left( \frac{M-1}{2} - m \right) * \Delta p + C(Z_p)$$
$$Z(m) = Z_p$$

where m=0, . . . , M−1 represents a row number, $Z_P$ represents a table Z position at which the $P^{th}$ image is reconstructed, $C(Z_P)$ represents a vertical coordinate of an image center of the $P^{th}$ image which has been adjusted;

a second coordinate module, configured to calculate coordinate information (y(n),z(n)) of each row of the target image, where y(n) represents y axis coordinate of a $n^{th}$ row, z(n) represents z axis coordinate of a $n^{th}$ row, and n=0, . . . , M−1 represents a row number; and a first processing module, configured to perform an interpolation process on (Y(m),Z(m)) in both Y and Z directions, so as to obtain pixel values of a target image, whose coordinate is (y(n),z(n)).

In some embodiments, the second coordinate module may include:

a fitting sub-module, configured to perform curve-fitting, using the least square method, on a scale position $Z_i$ that a scanning table locates when each image is reconstructed and a corresponding drop offset $D(Z_i)$ of the scanning table, to obtain a line y=kz+b that the scanning table locates with bias;

a line sub-module, configured to calculate, according to a vertical relation between a line that a target image locates and a line that the scanning table locates with bias, the line that the target image center locates $$y = -\frac{1}{k}z + \frac{(Z_i - Z_s)\sqrt{k^2+1} + Z_s}{k},$$

where $$Z_s = -\frac{b}{k}$$

represents ad intercept of the line that the scanning table locates with bias on z axis; and a coordinate sub-module, configured to calculate, according to the line that the target image center lies on $$y = -\frac{1}{k}z + \frac{(Z_i - Z_s)\sqrt{k^2+1} + Z_s}{k},$$

coordinate information (y(n),z(n)) of each row in the target image, where $$y(n) = \frac{\left(\frac{M-1}{2} - n\right)*\Delta p}{\sqrt{1+k^2}} + C\left(Z_s + \frac{(Z_i - Z_s)}{\sqrt{1+k^2}}\right)$$

$$z(n) = -y(n)*k + (Z_i - Z_s)\sqrt{k^2+1} + Z_s$$

where y(n) represents y axis coordinate of the $n^{th}$ row, z(n) represents z axis coordinate of the $n^{th}$ row, and n=0, ..., M−1 represents a row number.

It should be noted that the modules of the apparatus described in embodiments of the present disclosure may be individual or be integrated into a CT apparatus.

In conclusion, the image position compensation apparatus provided in embodiments of the present disclosure can obtain a target image by measuring an actual height of the scanning table at a position where an image is reconstructed; calculating a drop offset using the actual height to adjust a reconstruction image; and performing an interpolation process on coordinate information of the adjusted image so as to obtain pixel values of the target image based on the fact that the target image is a normal section perpendicular to the scanning table. In this way, an image can be compensated in the process of post-reconstruction, which makes convenient for image processing. The image which has been processed with the image position compensation method can truly reflect practical information of the object under measurement, can modify bias of image center and inaccuracy of image position caused by the drop offset of the scanning table, and can provide correct image information for medical diagnosis, which thereby improves measurement quality of a CT apparatus.

It should be noted that embodiments of the present disclosure are described in a progressive manner, such that the difference will be described in detail in one embodiment, and the same or similar part may refer to each other. Regarding a system or apparatus provided in the embodiments, as it corresponds to a method provided in the embodiments, the system or apparatus is described simply and may refer to the corresponding method for related contents.

It should be noted that, the terms "first", "second", and the like in the description and in the claims, are used for distinguishing between similar elements and not tend to describe a particular sequential and chronological order. Furthermore, the terms "comprise", "include" and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus. Similarly, the term "include a" or "comprise a" is not necessarily limited that a process, method, article, or apparatus may include an element, but may further include other similar elements.

It will be apparent to those skilled in the art that some or all of the procedures of such methods provided in embodiments of the present disclosure may be performed by related hardware in response to some computer programs. The computer programs may be stored in a computer-readable storage medium, which may execute the processes of the methods described in the above embodiments. The storage medium may be an optical disk, a magnetic disk, a Read-Only Memory (ROM), or a Random Access Memory (RAM), etc.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

We claim:

1. An image position compensation method, comprising:
   calculating an actual height at Z position and a corresponding drop offset of a scanning table based on an image obtained by scanning;
   adjusting, according to the drop offset of the scanning table, a vertical coordinate of a center of the image in the process of post-reconstruction, so as to obtain an adjusted image; and
   performing an interpolation process on coordinate information and pixel values of each row in the adjusted image, to obtain pixel values of each row in a target image,
   wherein calculating an actual height at Z position and a corresponding drop offset of a scanning table based on an image obtained by scanning comprises:
      obtaining a height of a X-ray source rotating center, a center coordinate of a preview image, a reconstruction field of view (FOV) of the preview image, and a matrix size of the preview image, searching the preview image row by row to obtain a greatest row number in which some pixel values are greater than a first threshold,
      according to the matrix size of the preview image, the height of the X-ray source rotating center, the center coordinate of the preview image, the reconstruction FOV of the preview image and the greatest row number in which some pixel values are greater than the first threshold, calculating an actual height of a scanning table in the preview image, and calculating a difference between the actual height of the scanning table and a nominal height of the scanning table, wherein the difference equals to a drop offset of the scanning table; or
      obtaining a height of a X-ray source rotating center, a center coordinate of a pilot image, a reconstruction FOV of the pilot image, and a matrix size of the pilot image, searching in each column of the pilot image to find a greatest row number in which pixel value is greater than a second threshold, according to the matrix size of the pilot image, the height of the X-ray source rotating center, the center coordinate of the pilot image, the reconstruction FOV of the pilot image and in each column the greatest row number in which pixel value is greater than the second threshold, calculating an actual height of a scanning table at Z position in the preview image, and calculating a difference between the actual height of the scanning table and a nominal height of the scanning table, where the difference equals to a drop offset of the scanning table at the Z position.

2. The method according to claim 1, wherein after obtaining the height of the X-ray source rotating center, the center coordinate of the preview image, the reconstruction FOV of the preview image, and the matrix size of the preview image, the method further comprises:
   according to the nominal height of the scanning table, the matrix size of the preview image, the height of the X-ray source rotating center, the center coordinate of the preview image, and the reconstruction FOV of the preview image, calculating a theoretical vertical coordinate value of pixels in the preview image when the height of the scanning table equals to the nominal height;

where searching the preview image row by row to obtain the greatest row number in which some pixel values are greater than the first threshold comprises:

according to the theoretical vertical coordinate value of pixels in the preview image, searching a plurality of rows neighboring to a row whose vertical coordinate equals to the theoretical vertical coordinate value to obtain a greatest row number where some pixel values are greater than the first threshold.

3. The method according to claim 2, wherein the step of according to the nominal height of the scanning table, the matrix size of the preview image, the height of the X-ray source rotating center, the center coordinate of the preview image, and the reconstruction FOV of the preview image, calculating a theoretical vertical coordinate value of pixels in the preview image when the height of the scanning table equals to the nominal height comprises:

acquiring a nominal height of a scanning table H2, a matrix size of the preview image M×M, a height of a X-ray source rotating center H1, a center coordinate of the preview image ($cX_i, cY_i$), and a reconstruction FOV of the preview image FOV ; and according to equation $$Y_{couch}^{init} = \left\lfloor \frac{M-1}{2} + \frac{cY_i - (H2-H1)}{\Delta p} \right\rfloor,$$

calculating a vertical coordinate value $Y_{couch}^{init}$ of pixels in the preview image when the height of the scanning table equals to the nominal height, where the operator $\lfloor \bullet \rfloor$ represents integer arithmetic, $$\Delta p = \frac{FOV}{M}$$

represents an actual width of a pixel, and $cY_i$, represents a vertical coordinate value of the image center.

4. The method according to claim 1, wherein the step of according to the matrix size of a preview image, the height of the X-ray source rotating center, the center coordinate of the preview image, the reconstruction FOV of the preview image and the determined row having the greatest row number, calculating an actual height of a scanning table in the preview image comprises:

acquiring a nominal height of a scanning table H2, a matrix size of the preview image M×M, a height of a X-ray source rotating center H1, a center coordinate of the preview image ($cX_i, cY_i$), a reconstruction FOV of the preview image FOV, and the greatest row number $Y_{couch}$; and according to equation $$H_i = cY_i + \left( \frac{M-1}{2} - Y_{couch} \right) * \Delta p + H1,$$

calculating an actual height $H_i$, of a scanning table in the preview image, where $$\Delta p = \frac{FOV}{M}$$

represents an actual width of a pixel.

5. The method according to claim 1, wherein after obtaining the height of the X-ray source rotating center, the center coordinate of the pilot image, the reconstruction FOV of the pilot image, and the matrix size of the pilot image, the method further comprises:

according to the nominal height of the scanning table, the matrix size of the pilot image, the height of the X-ray source rotating center, the center coordinate of the pilot image, and the reconstruction FOV of the pilot image, calculating a theoretical vertical coordinate value of pixels in the pilot image when the height of the scanning table equals to the nominal height;

where searching in each column of the pilot image to find the greatest row number in which pixel value is greater than the second threshold comprises:

in each column, according to the theoretical vertical coordinate value of pixels in the pilot image, searching a plurality of rows neighboring to a row whose vertical coordinate equals to the theoretical vertical coordinate value to obtain a greatest row number where pixel value is greater than the second threshold.

6. The method according to claim 5, wherein the step of according to the nominal height of the scanning table, the matrix size of the pilot image, the height of the X-ray source rotating center, the center coordinate of the pilot image, and the reconstruction FOV of the pilot image, calculating a theoretical vertical coordinate value of pixels in the pilot image when the height of the scanning table equals to the nominal height comprises:

acquiring a nominal height of a scanning table H2, a matrix size of the pilot image N×M, a height of a X-ray source rotating center H1, a center coordinate of the pilot image (cX,cY), and a reconstruction FOV of the pilot image FOV; and according to equation $$Y_{couch}^{init} = \left\lfloor \frac{M-1}{2} + \frac{cY - (H2-H1)}{\Delta p} \right\rfloor,$$

calculating a vertical coordinate value $Y_{couch}^{init}$ of pixels in the pilot image when the height of the scanning table equals to the nominal height, where the operator $\lfloor \bullet \rfloor$ represents integer arithmetic, $$\Delta p = \frac{FOV}{M}$$

represents an actual width of a pixel, and cY represents a vertical coordinate value of the image center.

7. The method according to claim 1, wherein the step of according to the matrix size of the pilot image, the height of the X-ray source rotating center, the center coordinate of the pilot image, the reconstruction FOV of the pilot image and in each column the greatest row number where pixel value is greater than the first threshold, calculating an actual height of a scanning table at Z position in the preview image comprises:

acquiring a nominal height of a scanning table H2, a matrix size of the pilot image N×M, a height of a X-ray source rotating center H1, a center coordinate of the pilot image (cX,cY), a reconstruction FOV of the pilot image FOV, and the greatest row number $Y_{couch}$; and
according to equation $$H_i = cY + \left(\frac{M-1}{2} - Y_{couch}\right) * \Delta p + H1,$$

calculating an actual height $H_i$ of a scanning table at a Z position $Z_i$ in the pilot image, where $$\Delta p = \frac{FOV}{M}$$

represents an actual width of a pixel.

8. The method according to 1, wherein performing an interpolation process on coordinate information and pixel values of each row in the adjusted image, to obtain pixel values of each row in a target image comprises:
obtaining coordinate information (Y(m),Z (m)) of each row from each of the $$Y(m) = \left(\frac{M-1}{2} - m\right) * \Delta p + C(Z_p)$$

adjusted images, where Z(m)=$Z_p$
where m=0, . . . , M−1 represents a row number, $Z_p$ represents a table Z position at which the $P^{th}$ image is reconstructed, $C(Z_p)$ represents a vertical coordinate of an image center of the $P^{th}$ image which has been adjusted;
according to the drop offset, performing curve-fitting to calculate the profile of a bias table where the target images center locate, and the target image plane is perpendicular to the profile at each table position on each target image plane;
calculating coordinate information (y(n),z(n)) of each row of the target image, where y(n) represents y axis coordinate of a $n^{th}$ row, z(n) represents z axis coordinate of a $n^{th}$ row, and n=0, . . . , M−1 represents a row number; and
performing an interpolation process on (Y(m),Z(m)) in both Y and Z directions, so as to obtain pixel values of a target image, whose coordinate is (y(n),z(n)).

9. An image position compensation apparatus, comprising:
a measurement device, configured to calculate an actual height at Z position and a corresponding drop offset of a scanning table based on an image obtained by scanning;
an adjusting device, configured to adjust, according to the drop offset of the scanning table, a vertical coordinate of a center of the image in the process of post-reconstruction, so as to obtain an adjusted image; and
an interpolation device, configured to perform an interpolation process on coordinate information and pixel values of each row in the adjusted image, to obtain pixel values of each row in a target image,
wherein the measurement device comprises:
a first acquiring module, configured to obtain a height of a X-ray source rotating center, a center coordinate of a preview image, a reconstruction field of view (FOV) of the preview image, and a matrix size of the preview image; a first search module, configured to search the preview image row by row to obtain a greatest row number in which some pixel values are greater than a first threshold; a first calculation module, configured to calculate, according to the matrix size of the preview image, the height of the X-ray source rotating center, the center coordinate of the preview image, the reconstruction FOV of the preview image and the greatest row number in which some pixel values are greater than the first threshold, an actual height of a scanning table in the preview image; and a first difference module, configured to calculate a difference between the actual height of the scanning table and a nominal height of the scanning table, where the difference equals to a drop offset of the scanning table; or
a second acquiring module, configured to obtain a height of a X-ray source rotating center, a center coordinate of a pilot image, a reconstruction FOV of the pilot image, and a matrix size of the pilot image; a second search module, configured to search row by row in each column of the pilot image to find a row number in which pixel value is greater than a second threshold; a second calculation module, configured to calculate, according to the matrix size of the pilot image, the height of the X-ray source rotating center, the center coordinate of the pilot image, the reconstruction FOV of the pilot image and in each column the greatest row number where pixel value is greater than the second threshold, an actual height of a scanning table at Z position in the preview image; and a second difference module, configured to calculate a difference between the actual height of the scanning table and a nominal height of the scanning table, where the difference equals to a drop offset of the scanning table at the Z position.

10. The apparatus according to claim 9, wherein the measurement device further comprises:
a first estimation module, configured to calculate, according to the nominal height of the scanning table, the matrix size of the preview image, the height of the X-ray source rotating center, the center coordinate of the preview image and the reconstruction FOV of the preview image, a theoretical vertical coordinate value of pixels in the preview image when the height of the scanning table equals to the nominal height;
wherein the first search module is configured to search, according to the theoretical vertical coordinate value of pixels in the preview image, a plurality of rows neighboring to a row whose vertical coordinate equals to the theoretical vertical coordinate value to obtain a greatest row number where some pixel values are greater than the first threshold.

11. The apparatus according to claim 10, wherein the first estimation module comprises:
a first acquiring sub-module, configured to acquire a nominal height of a scanning table H2, a matrix size of the preview image M×M, a height of a X-ray source rotating center H1, a center coordinate of the preview image $(cX_i,cY_i)$, and a reconstruction FOV of the preview image FOV; and
a first estimation sub-module, configured to calculate, according to equation $$Y_{couch}^{init} = \left\lfloor \frac{M-1}{2} + \frac{cY - (H2 - H1)}{\Delta p} \right\rfloor,$$

a vertical coordinate value $Y_{couch}^{init}$ of pixels in the preview image when the height of the scanning table equals to the nominal height, where the operator $\lfloor \cdot \rfloor$ represents integer arithmetic, $$\Delta p = \frac{FOV}{M}$$

represents an actual width of a pixel, and $cY_i$ represents a vertical coordinate value of the image center.

12. The apparatus according to claim 9, wherein the first calculation module comprises:
   a first obtaining sub-module, configured to acquire a nominal height of a scanning table H2, a matrix size of the preview image M×M, a height of a X-ray source rotating center H1, a center coordinate of the preview image ($cX_i, cY_i$), a reconstruction FOV of the preview image FOV, and the greatest row number $Y_{couch}$; and
   a first calculation sub-module, configured to calculate, according to equation $$H_i = cY + \left(\frac{M-1}{2} - Y_{couch}\right) * \Delta p + H1,$$

an actual height $H_i$ of a scanning table in the preview image, where $$\Delta p = \frac{FOV}{M}$$

represents an actual width of a pixel.

13. The apparatus according to claim 9, wherein the measurement device further comprises:
   a second estimation module, configured to calculate, according to the nominal height of the scanning table, the matrix size of the pilot image, the height of the X-ray source rotating center, the center coordinate of the pilot image and the reconstruction FOV of the pilot image, a theoretical vertical coordinate value of pixels in the pilot image when the height of the scanning table equals to the nominal height,
   wherein the second search module is configured to search in each column of the pilot image, according to the theoretical vertical coordinate value of pixels in the pilot image, a plurality of rows neighboring to a row whose vertical coordinate equals to the theoretical vertical coordinate value to obtain a greatest row number where pixel value is greater than the second threshold.

14. The apparatus according to claim 13, wherein the second estimation module comprises:
   a second acquiring sub-module, configured to acquire a nominal height of a scanning table H2, a matrix size of the pilot image N×M, a height of a X-ray source rotating center H1, a center coordinate of the pilot image (cX, cY), and a reconstruction FOV of the pilot image FOV; and
   a second estimation sub-module, configured to calculate, according to equation $$Y_{couch}^{init} = \left\lfloor \frac{M-1}{2} + \frac{cY - (H2 - H1)}{\Delta p} \right\rfloor,$$

a vertical coordinate value $Y_{couch}^{init}$ of pixels in the pilot image when the height of the scanning table equals to the nominal height, where the operator $\lfloor \cdot \rfloor$ represents integer arithmetic, $$\Delta p = \frac{FOV}{M}$$

represents an actual width of a pixel, and cY represents a vertical coordinate value of the image center.

15. The apparatus according to claim 9, wherein the second calculation module comprises:
   a second obtaining sub-module, configured to acquire a nominal height of a scanning table H2, a matrix size of the pilot image N×M, a height of a X-ray source rotating center H1, a center coordinate of the pilot image (cX, cY), a reconstruction FOV of the pilot image FOV, and the greatest row number $Y_{couch}$; and
   a second calculation sub-module, configured to calculate, according to equation $$H_i = cY + \left(\frac{M-1}{2} - Y_{couch}\right) * \Delta p + H1,$$

an actual height $H_i$ of a scanning table at a Z position $Z_I$ in the pilot image, where $$\Delta p = \frac{FOV}{M}$$

represents an actual width of a pixel.

16. The apparatus according to claim 9, wherein the interpolation device comprises:
   a first coordinate module, configured to obtain coordinate information (Y(m),Z(m)) of each row from each of the adjusted images, where $$Y(m) = \left(\frac{M-1}{2} - m\right) * \Delta p + C(Z_p)$$

$$Z(m) = Z_p$$

where m=0, . . . ,M−1 represents a row number, $Z_p$ represents a scale position at which a $P^{th}$ image is reconstructed by the scanning table, $C(Z_p)$ represents a vertical coordinate of an image center of the $P^{th}$ image which has been adjusted;
   a second coordinate module, configured to perform, according to the drop offset, curve-fitting to calculate the profile of a bias table where the target images center locate, and the target image plane is perpendicular to the profile at each table position on each target image plane, and calculate coordinate information (y(n),z(n)) of each row of the target image, where y(n) represents y axis coordinate of a $n^{th}$ row, z(n) represents z axis coordinate of a $n^{th}$ row, and n=0, . . . ,M−1 represents a row number; and
   a first processing module, configured to perform an interpolation process on (Y(m),Z(m)) in both Y and Z directions, so as to obtain pixel values of a target image, whose coordinate is (y(n), z(n)).

* * * * *